Patented July 4, 1939

2,164,914

UNITED STATES PATENT OFFICE 2,164,914

ENZYME PREPARATION

Herbert C. Gore, Scarsdale, George Kirby, Yonkers, and Charles N. Frey, Scarsdale, N. Y., assignors to Standard Brands Incorporated, New York, N. Y., a corporation of Delaware No Drawing. Application October 31, 1935, Serial No. 47,630

11 Claims. (Cl. 195—68)

The invention relates to an invertase preparation and to a method for its production. More particularly, it relates to a method for the separation of invertase from the cells containing it and includes correlated improvements and discoveries whereby such separation is effected.

Yeast has been known for a long time as a principal source of invertase, and many methods have been proposed for its separation. Among the methods proposed may be mentioned that of Hudson (J. Am. Chem. Soc., vol. 36, page 1566), by means of which a comparatively weak invertase was obtained by dialysis; that of Reynolds (Ind. Eng. Chem., vol. 16, page 169), involving ultra-filtration by means of a colloid membrane, and that of Willstaetter (Zeit. Physiol. Chem., vol. 116, page 53) in which specially prepared alumina or other materials were used to adsorb the invertase, which was followed by elutriation. These methods all utilize procedures which are intrinsically expensive and which are involved to an extent such that a commercial separation of invertase is impracticable.

It is an object of this invention to provide a process for the preparation of invertase, that does not require either dialysis, ultra-filtration, adsorption or elutriation, and hence that is free from such costly procedures.

A further object of the invention is to provide a process whereby invertase may be obtained from yeast efficiently on a commercial scale and at a low production cost.

Another object of the invention is to provide a process whereby a solution of invertase may be obtained directly from yeast and having an activity such that evaporation is not required to make it sufficiently active for utilization commercially.

An additional object of the invention is to provide an invertase preparation of good color, i. e., colorless to amber, high activity, good keeping qualities, and substantially free from possibility of damage due to freezing.

Other objects of the invention will in part be obvious and will in part appear hereinafter.

The invention accordingly comprises the several steps and the relation of one or more of such steps with respect to each of the others and the enzyme product having the features and properties which are exemplified in the following detailed disclosure and the scope of the invention will be indicated in the claims.

In the practice of the invention, invertase which is a colloid enzyme and closely held within the cells of certain living organisms, such as fruits, stems, potatoes, roots, especially the sugar beet, and various fungi as Aspergilli, Penicillia, Mucorales, and especially among yeasts, may be separated from the enclosing cell tissue at a suitable pH, for example from yeast, by killing the yeast cells and allowing the yeast to undergo autolysis at a temperature of 25–35° C., preferably in the presence of an alkaline material. The autolyzed mass may then be filtered, desirably after dilution and the addition of a filtering aid, e. g., kieselguhr, "Filter-Cel", etc., and the filter cake so obtained thoroughly washed. The filter cake is discarded. The filtrate containing invertase is now acidified by means of a mineral acid, as phosphoric, hydrochloric, sulfuric, and preferably with the addition of a small percentage of a decolorizing carbon. A precipitate is formed consisting principally of yeast protein and, after standing for a period which may be several hours, the precipitated material and the carbon are separated from the liquid. The filtrate thus obtained is reacted with an antacid substance, for example, calcium carbonate, magnesium carbonate, sodium carbonate, etc., until the solution has a pH value of about 4.5 to 6 or 6.5. Preferably, the antacid substance is one which is insoluble in water and which is added in excess. When an excess is added, the mixture is filtered and the solution degasified as by aeration effected by passing a current of air therethrough.

The invertase preparation produced in the foregoing manner is one of good color, viz. colorless to amber, of high activity, i. e., having an inverting value of K.25 to K.8, and of good keeping qualities, such that when retained at a temperature of about 37° C. for about 70 days the decrease in activity is substantially not more than 3%, and does not require evaporation to place it in suitable condition for marketing and commercial use. In order to improve its stability, to preserve it, and to minimize the danger due to freezing, the preparation may be admixed with a suitable preservative, for example, ethylene glycol, glycerine, mannitol, cane sugar and erythrol. We have found that an invertase preparation to which glycerine has been added to give a concentration of about 50% glycerine has excellent keeping qualities and is well adapted for use.

As an illustrative embodiment of a manner in which the invention may be practiced, the following description is presented. In order to release invertase from yeast, it is necessary first to kill the yeast cells, whereupon a freeing of the enzyme may be accomplished by autolysis of the yeast which then takes place. Killing of the yeast may be accomplished by mixing therewith about 2–3% of toluene. Preferably, there is also admixed a small amount, about 0.5 to 2.0% of an alkaline reacting material, e. g., sodium carbonate. The mixture is allowed to undergo autolysis at a temperature of about 30° C. for a period of several days, then the mass is diluted with about 70% of water or of an invertase containing filtrate obtained in a previous filtering operation, about 20% of kieselguhr added, and the mass filtered. The filter cake so obtained is then, preferably, mixed with a weak invertase containing filtrate resulting from a filtering operation in the processing of a previous batch, again filtered and, if desired, the filter cake mixed with water and this mixture subjected to filtration.

The filtrates, other than the first one, may be, and are preferably used as above indicated for diluting, and for extracting invertase from the filter cake of the first separation, that is, immediately following autolysis. The filtrate obtained as a result of separating solids from the liquid immediately following autolysis may be strongly acidified to a pH 4.5 to 3.5 by the addition of phosphoric acid, or other suitable inorganic acid, and, more particularly, 85% phosphoric acid diluted in the ratio of 1–5. The addition of acid is desirably made as a thin stream with constant stirring. During the acidification treatment there may preferably be added a small amount of a suitable decolorizing carbon, such as "Darco", "Norit", in an amount of about 1%. A precipitate, which consists substantially of yeast protein, immediately forms, which increases in amount upon standing. After a period of several hours the precipitate and the added carbon are removed by filtration.

The acidity of the filtrate, if desired, may be reduced to a value of pH 4.5 to 6 by adding powdered calcium carbonate thereto in excess. The mixture is stirred for a period sufficient to give the desired reaction with the calcium carbonate when the excess is removed by filtering, and the filtrate subjected to aeration with a current of air in order to remove the carbon dioxide dissolved therein. The invertase preparation thus produced is possessed of high activity and is suitable for marketing without further concentration. It is, however, sometimes desired that the preparation have a definite activity so that the formulas in connection with which it may be used will not vary. When such is desired, the activity may be adjusted to the proper value by measuring the inverting power upon a standard solution of cane sugar, and then adding, if necessary, a stronger or weaker invertase solution to give the proper degree of activity. For the purpose of increasing the stability and preserving the invertase preparation, as well as to minimize the danger due to freezing, glycerine may be added, as 100% U. S. P. glycerine. The addition of the glycerine is in an amount such that the concentration in the final preparation will correspond to about 50 glycerine.

The foregoing procedure yields an invertase preparation suitable for commercial purposes, but inasmuch as yeast, particularly autolyzed yeast, is a highly perishable biological product, which spoils readily unless proper precautions are taken, it is desirable that the process be carried through without undue delay and in thoroughly clean apparatus.

It will be realized that the invention in its more general aspects is not limited to the exact mode of procedure, nor to the specific quantities and conditions set forth in the foregoing description, but that these conditions and quantities may be modified without departing from the spirit and scope of the invention. Certain of these variations will now be set forth.

The killing of yeast may be accomplished with the use of other substances than toluene, e. g., benzene, xylenes, diethylene dioxide, glycerine, and like solvents, but we prefer to use toluene as it has been found to give excellent uniform results and is readily available. The autolysis of the yeast may be carried out without the addition of an alkaline reacting material, but the results obtained are improved and the processing facilitated by the use of such materials, e. g., sodium carbonate. Thus, the use of from 0.5 to 1% of sodium carbonate increases the activity of the invertase preparation to the extent of about 10%. Further, it materially shortens the time required for autolysis, that is, it reduces the period within which the yeast mass may be filtered to obtain an invertase containing filtrate. Without the use of sodium carbonate, 5 to 7 days may be required for the autolysis, but with the addition of sodium carbonate the mass may be filtered at the end of about 16 hours. This effect of sodium carbonate is believed not to be primarily associated with the pH value. We have found that autolysis proceeds for the production of invertase with a pH range of from 5.6 to 8.6. It appears that the optimum pH range is from 5.6 to 7.0. The reason for this optimum appears to be that if the yeast is too alkaline the invertase will be rapidly released, but the separation of the mass is very much impeded because of its gelatinous condition. Furthermore, the invertase preparation is darker in color when produced from yeast autolyzed under distinctly alkaline conditions. In addition to sodium carbonate other alkaline substances may be used, such as ammonia, sodium bicarbonate, diammonium hydrogen phosphate, disodium hydrogen phosphate, trisodium phosphate, potassium carbonate, potassium bicarbonate, etc. Of these various materials, however, it is preferred to use sodium carbonate because of the constancy of the results obtained through its utilization. The addition of 0.5 to 1% sodium carbonate usually causes the yeast to become sticky and, if desired, the mass may be plasmolyzed by the addition of salt, sugar, or glycerol thereto, whereupon it will flow more readily from the mixer. This addition, however, is usually not necessary.

The preferred temperature of autolysis is about 30° C. This temperature may be varied from about 25°–35° C. However, below about 25° the autolytic action becomes so slow as to be substantially commercially impracticable and at times above 35° C. the invertase may be more or less inactivated. As a result of autolysis continuing for a period of several hours, the yeast mass becomes fluid. Usually this condition will result by permitting the mass to stand over night with or without the addition of a small amount of sodium carbonate. We have found it desirable, from the standpoint of ready separation by filtration, to allow the mass to remain for about 4 days. This will vary inasmuch as different lots of yeast will be found to undergo autolysis at different rates. However, during this period a marked liberation of invertase from the yeast will have taken place. It is not necessary that the yeast mass be diluted prior to filtration. It may be filtered by simply adding about 10% of kieselguhr and utilizing a plate and frame filter press. If a larger amount of kieselguhr is admixed, the mass becomes semi-solid and cannot readily be transferred to a filter press by means of a pump. The filtration too is very slow and a large portion of the invertase will remain in the filter cake. A portion of this may be removed by repressing, e. g., by forming into cakes and pressing these cakes in a press of the type used for pressing cotton seed oil.

It is more desirable and the process may be carried out more expeditiously by mixing the autolyzed yeast mass with about 70% of water, or of a filtrate from a previous filtration and about 20% of kieselguhr. Such a mixture can be readily filtered and the invertase remaining in the residue removed by further treatment, for example, in a countercurrent manner. We prefer, when proceeding in this manner, to make three successive filtrations of each lot of autolyzed yeast. In the first filtration the autolyzed yeast is mixed with about 20% of kieselguhr and about 70% of the filtrate derived from the second filtration of a previous operation. For this filtration there may be used a center feed filter press which forms a cake of about 1½" in thickness and which will require about three hours at 25–90 lbs. pressure. This first filtrate constitutes the crude invertase and is that filtrate which is subsequently acidified and further treated to place it in proper form for marketing.

The filter cake produced in the first filtration is mixed with the filtrate resulting from the third filtration of a previous lot of autolyzed yeast in a quantity of about 70% of the original yeast. The admixture is then filtered under the aforesaid conditions and the filtrate obtained is used for mixing with a fresh batch of autolyzed yeast prior to filtering. The filter cake from the second filtration is mixed with water and then filtered. The filtrate thus obtained is used for mixing with the filter cake secured during the first filtration of a succeeding operation. The filter cake obtained from the third filtration is substantially completely exhausted of invertase and, accordingly, is rejected. In the place of water utilization may be made of glycerine during the filtering operation. This will result in an invertase preparation which will require little or no additional glycerine as a preservative agent.

The treatment with a strong acid and with a decolorizing carbon removes a considerable portion of the yeast protein from the invertase solution, which greatly improves the clearness and gives a preparation of good color, i. e., colorless to amber, in which the clarity is in a large measure retained. The color of the preparation is also improved due to the adsorption of colored substances by the carbon. Further, the carbon acts as an adsorber for a goodly part of the yeast odor. The odor of the product may be further improved by adding a material which will serve to overcome any yeast odor, e. g., vanillin, bourbonal, and others. These additions are made with the object of improving the odor rather than of imparting to the preparation a distinctive flavor. Further, as above set forth the invertase preparation possesses a color which may be from colorless to amber, of high activity, i. e., having an inverting value of K.25 to K.8 and good keeping qualities, as evidenced by a decrease in activity of substantially not more than 3% when retained at a temperature of about 37° C. for about 70 days. More particularly the inverting activity of the invertase produced in accordance with the method described herein may be determined by inoculating a 10% cane sugar solution at a constant temperature of about 20° C., and having a pH value of 4.6 with the invertase preparation, and measuring the polarization initially and after a period of about 4 to 5 hours. The rate of reaction constant K is calculated through use of the following formula:

$$K = \frac{1}{t} \log \frac{a}{a-x}$$

in which $t$ represents reaction time, $a$ rotation of the sugar solution initially and $a-x$ the rotation at the time $t$. When equal quantities are taken this constant measures the invertase strength or content thereof. Thus, it has been found that invertase produced in accordance with the foregoing procedure has the value $K = .25$ to $.8$.

The final acidity of the invertase solution per se may range from a pH of 3.5 to 6.5, preferably from about 4.5 to 6 and more particularly 5.1 and may be adjusted to such values by the addition of an antacid substance either as an insoluble, or as a soluble material. When an insoluble material is used, as calcium carbonate, it is added in excess; the reaction allowed to continue until the desired pH is reached, and the excess removed, e. g., by filtration. When a soluble antacid, as sodium bicarbonate, is used, the amount added will be that sufficient to adjust the solution to the proper conditions of acidity. Following the adjustment of acidity, the solution is aerated, as by passing a current of air therethrough, in order to remove the carbon dioxide. We have found such removal desirable even though a carbonate was not used in adjusting the acidity for the reason that carbon dioxide is evolved during the autolysis of the yeast, and hence the liquids or filtrates normally contain a considerable amount of this gas and may even be supersaturated therewith. Such a preparation, if placed in sealed containers without the removal of the $CO_2$, would develop appreciable pressure and the containers might be ruptured.

The presence of a preservative, as glycerine, in the invertase preparation serves several purposes. It stabilizes, or preserves the preparation so that it will retain its activity, color and clearness for prolonged periods, namely, many months, when kept at a temperature of 14–15° C. that is, a temperature readily available in an ordinary refrigerator. This stability may be secured with a percentage of glycerine which is lower than 50% but, when lower percentages are used, the most desirable results do not accrue, thus, if only 30% is used, there may be separation of a flocculent partly crystalline precipitate which consists in part at least of tyrosin. In addition to glycerine, other substances of the character of glycerine and having a preservative effect may be used. It will be realized also that the preservative may be added other than as a final step, and they give their ultimate preserving action in all cases.

Since certain changes in carrying out the above method, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is in part a continuation of our copending application, Serial No. 618,468, filed June 21, 1932.

We claim:

1. A method for the production of an invertase preparation, which comprises subjecting yeast to autolysis in a medium having a pH value of about 5.6 to 8.6, separating solid and liquid, acidifying the liquid so obtained to a pH value of 3.5 to 4.5, whereby yeast protein is precipitated, filtering and then reacting the filtrate thus obtained with an antacid to give a pH value of 4.5 to 6.5.

2. A method for the production of an invertase preparation, which comprises subjecting yeast to autolysis in a medium having a pH value of about 5.6 to 8.6, separating solids from the liquid, acidifying the liquid with a mineral acid to a pH value of about 3.5 to 4.5, whereby yeast protein is precipitated, filtering and reacting the filtrate thus obtained with an antacid to give a pH value of about 4.5 to 6.5.

3. A method for the production of an invertase preparation, which comprises subjecting yeast to autolysis in a medium having a pH value of about 5.6 to 8.6, separating solids from the liquid, acidifying the liquid with a mineral acid to a pH value of about 3.5 to 4.5, whereby yeast protein is precipitated, filtering, reacting the filtrate thus obtained with an antacid to give a pH value of about 4.5 to 6.5, and adding a preservative thereto.

4. A method for the production of an invertase preparation, which comprises subjecting yeast to autolysis in the presence of an alkaline material and at a pH of 7 to 8.6, separating solids from the liquid, acidifying the liquid with a mineral acid to a pH of 3.5 to 4.5, whereby yeast protein is precipitated, filtering and reacting the filtrate thus obtained with an antacid to give a pH value of from 4.5 to 6.5.

5. A method for the production of an invertase preparation, which comprises killing yeast, autolyzing in the presence of an alkaline material and at a pH of 7 to 8.6, diluting and adding kieselguhr as a filter aid thereto, filtering, acidifying the filtrate with a mineral acid to a pH of 3.5 to 4.5, again filtering, and reacting the filtrate thus obtained with an antacid to give a pH value of about 4.5 to 6.5.

6. A method for the production of an invertase preparation, which comprises killing yeast, subjecting to autolysis in the presence of an alkaline material at a pH of 7 to 8.6 and at a temperature of 25°-35° C., diluting with about 70% liquid, adding kieselguhr as a filtering aid, filtering, acidifying the filtrate with a mineral acid to a pH of 3.5 to 4.5, adding a decolorizing material, again filtering, reacting the filtrate thus obtained with an antacid to give a pH value of from 4.5 to 6.5, and removing carbon dioxide from the solution.

7. A method for the production of an invertase preparation, which comprises killing yeast, autolyzing in the presence of an alkaline material at a pH of 7 to 8.6 and at a temperature of about 30° C., diluting with about 70% water, adding kieselguhr as a filtering aid, filtering, acidifying the filtrate with a mineral acid to a pH of 3.5 to 4.5 and adding decolorizing carbon, again filtering, reacting the filtrate thus obtained with an antacid to give a pH of about 5.1, removing carbon dioxide by aeration, and adding a preservative.

8. A method for the production of an invertase preparation, which comprises killing yeast, by adding an aromatic hydrocarbon thereto, subjecting to autolysis in the presence of sodium carbonate at a pH of 7 to 8.6 and at a temperature of from 25°-35° C., diluting with about 70% water, adding kieselguhr, filtering and washing, acidifying the filtrate so obtained with a mineral acid to a pH value of 4.5 to 3.5, adding a decolorizing carbon, again filtering, reacting the filtrate thus obtained with calcium carbonate until an acidity of pH 4.5 to 6.5 is obtained, removing carbon dioxide by aeration, and adding glycerine.

9. A method for the production of an invertase preparation, which comprises killing yeast by adding toluene thereto, subjecting to autolysis in the presence of sodium carbonate at a pH of 7 to 8.6 and at a temperature of about 30° C., diluting with about 70% water and adding about 20% kieselguhr, filtering, washing, acidifying the filtrate by adding phosphoric acid thereto to a value of pH 4.5 to 3.5, adding a decolorizing carbon and allowing to stand, again filtering, reacting the filtrate thus obtained with calcium carbonate in excess to adjust the acidity to a pH of about 5.1, filtering to remove excess calcium carbonate, conducting a current of air through the solution to remove carbon dioxide, and adding glycerine to give a concentration thereof of about 50%.

10. A method for the production of an invertase preparation, which comprises releasing the invertase from cell tissues enclosing it at a pH of about 5.6 to 8.6, separating solid from liquid, acidifying the liquid to a pH of 3.5 to 4.5 whereby protein material is precipitated, filtering, and adjusting the acidity of the filtrate thus obtained to a pH value of 3.5 to 6.5 by the addition of an antacid substance.

11. A method for the production of an invertase preparation, which comprises killing yeast, subjecting to autolysis in a medium having a pH of 5.6 to 8.6, filtering, acidifying the filtrate to a pH of 3.5 to 4.5, adding thereto a decolorizing carbon, again filtering, adjusting the acidity of the filtrate thus obtained by reaction with an antacid to a pH value of 3.5 to 6.5 and adding a preservative agent.

HERBERT C. GORE.
GEORGE KIRBY.
CHARLES N. FREY.